United States Patent
Jain et al.

(10) Patent No.: US 10,163,132 B2
(45) Date of Patent: Dec. 25, 2018

(54) SYSTEMS AND METHODS TO CREATE A GEOGRAPHIC HEATMAP

(71) Applicant: eBay Inc., San Jose, CA (US)

(72) Inventors: Chintan Jain, Hillsboro, OR (US); Rui Kong, Lake Oswego, OR (US)

(73) Assignee: eBay Inc., San Jose, CA (US)

( * ) Notice: Subject to any disclaimer, the term of this patent is extended or adjusted under 35 U.S.C. 154(b) by 359 days.

(21) Appl. No.: 14/183,996

(22) Filed: Feb. 19, 2014

(65) Prior Publication Data

US 2015/0235266 A1    Aug. 20, 2015

(51) Int. Cl.
*G06Q 30/02*    (2012.01)
*H04W 4/021*    (2018.01)

(52) U.S. Cl.
CPC ........ *G06Q 30/0261* (2013.01); *H04W 4/021* (2013.01)

(58) Field of Classification Search
CPC ..................................................... G06Q 30/00
USPC ......................................................... 705/14
See application file for complete search history.

(56) References Cited

U.S. PATENT DOCUMENTS

| | | | |
|---|---|---|---|
| 8,489,596 B1* | 7/2013 | Milton | G06Q 30/02 455/456.1 |
| 2008/0091757 A1 | 4/2008 | Ingrassia et al. | |
| 2009/0063274 A1* | 3/2009 | Dublin, III | G06Q 30/02 705/14.1 |
| 2012/0094639 A1 | 4/2012 | Carlson et al. | |
| 2012/0129553 A1 | 5/2012 | Phillips et al. | |
| 2013/0091452 A1 | 4/2013 | Sorden et al. | |
| 2013/0181993 A1* | 7/2013 | Herring | G06T 11/206 345/440 |

(Continued)

FOREIGN PATENT DOCUMENTS

| | | | | |
|---|---|---|---|---|
| EP | 2343659 A1 * | 7/2011 | ....... | G06F 17/30241 |
| WO | WO-2015126896 A1 | 8/2015 | | |

OTHER PUBLICATIONS

"International Application Serial No. PCT/US2015/016301, International Search Report dated May 20, 2015", 2 pgs.

(Continued)

*Primary Examiner* — Eric R Netzloff
(74) *Attorney, Agent, or Firm* — Schwegman Lundberg & Woessner, P.A.

(57) ABSTRACT

A plurality of location data points is collected by a system, each location data point of the plurality of location data points corresponding to a request received at a central server from a user device of a user among a group of users. A geographic heatmap is created based on the collected plurality of location data points, the geographic heatmap identifying density distributions of the plurality of location data points, the density distributions being concentrations of the location data points included in each of a plurality of identified locations. The density distributions are analyzed within the geographic heatmap to identify a target location from one of the plurality of identified locations with a density profile including parameters exceeding one or more pre-defined thresholds. A geofence is generated around the target location, the geofence enabling detection of target users for distributions of promotional publications associated with the target location.

17 Claims, 11 Drawing Sheets

(56) References Cited

U.S. PATENT DOCUMENTS

| | | | | |
|---|---|---|---|---|
| 2013/0268353 A1* | 10/2013 | Zeto, III | ................ | G06Q 30/02 |
| | | | | 705/14.45 |
| 2014/0129293 A1* | 5/2014 | Chang | ................ | G06Q 30/0205 |
| | | | | 705/7.34 |
| 2014/0304391 A1* | 10/2014 | George | ................ | G06Q 30/02 |
| | | | | 709/224 |

OTHER PUBLICATIONS

"International Application Serial No. PCT/US2015/016301, Written Opinion dated May 20, 2015", 6 pgs.
"International Application Serial No. PCT/US2015/016301, International Preliminary Report on Patentability dated Sep. 1, 2016", 8 pgs.

* cited by examiner

SYSTEMS AND METHODS TO CREATE A GEOGRAPHIC HEATMAP

TECHNICAL FIELD

The subject matter disclosed herein generally relates to the processing of data. Specifically, the present disclosure addresses systems and methods to create a geographic heatmap.

BACKGROUND

A geofence may be generated around a target location. The geofence may be used to detect a user that crosses into the target location surrounded by the geofence. The proliferation of smart phones, such as Apple's iPhone, has enabled wide spread usage of location based services and advertising due to the technical capabilities of such devices. Many smart phones come equipped with a GPS receiver capable of pinpointing a location of the smart phone. As such, many smart phone devices, when communicating with a server, also transmit the location of the smart phone when using location-based services.

BRIEF DESCRIPTION OF THE DRAWINGS

Some embodiments are illustrated by way of example and not limitation in the figures of the accompanying drawings.

DETAILED DESCRIPTION

Example methods and systems are directed to create a geographic heatmap. Examples discussed herein merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Each of a plurality of client devices may request information from a central server. The requests may also be associated with various location data points. A location data point may correspond to a location of the client device at the time of the request to the central server. Over time, the central server may collect the location data points associated with each request in order to create a geographical heatmap. The geographical heatmap may facilitate visualization of client access patterns to the central server. For instance, the geographical heatmap may identify concentrations of location data points with significant activity with regards to access to the central server. Moreover, user demographic information regarding the clients may also be displayed in the geographic heatmap. Based on the geographic heatmap, a target location may be identified for distribution of promotional publications. To accomplish this, a geofence may be generated surrounding the target location in order to detect users that enter the target location and the promotional publications may be sent to those users.

Figure 1:
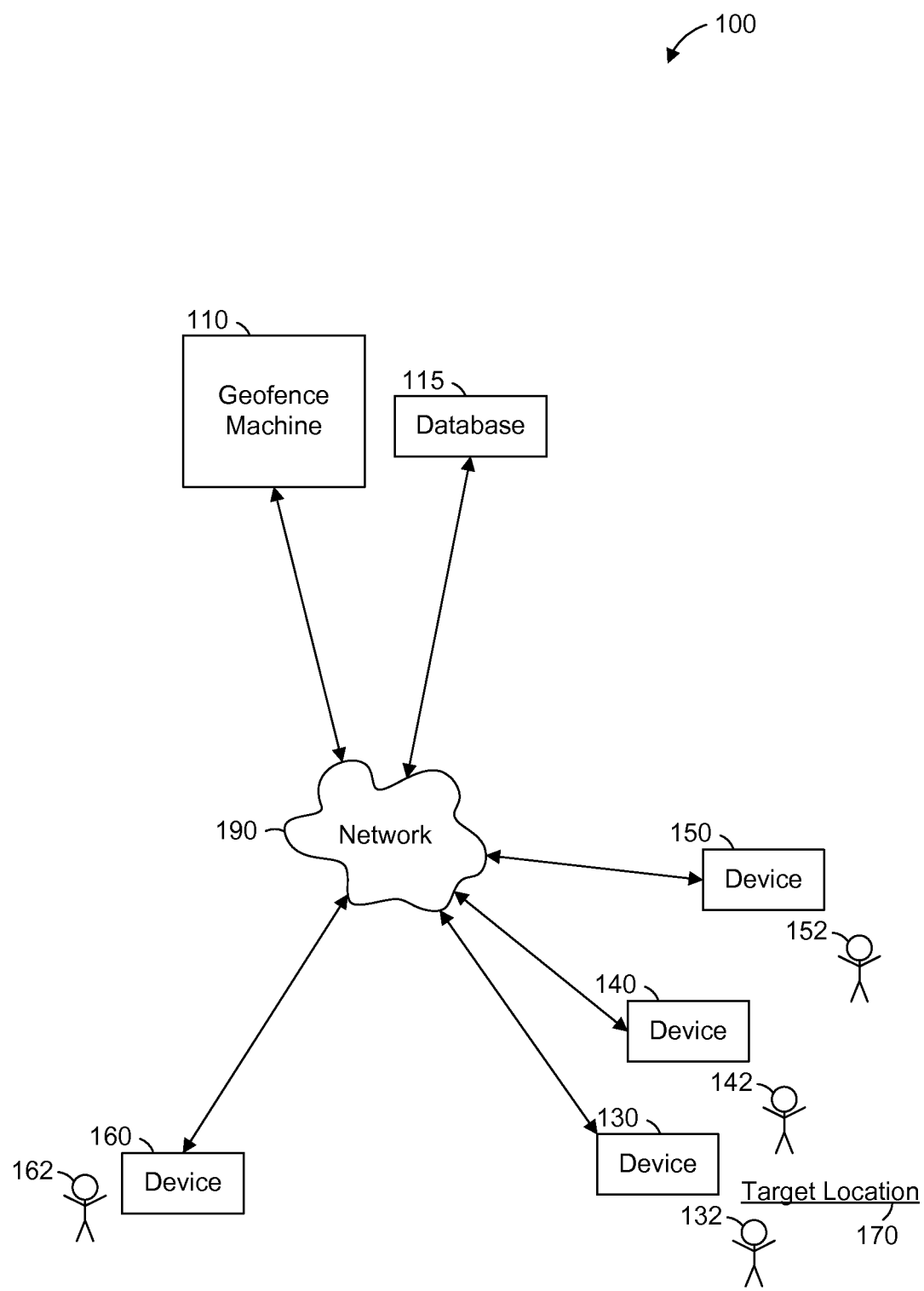
FIG. 1 is a network diagram illustrating a network environment suitable for generating a geographic heatmap, according to some example embodiments.

FIG. 1 is a network diagram illustrating a network environment 100 suitable for generating a geographic heatmap, according to some example embodiments. The network environment 100 includes a geofence machine 110, a database 115, and devices 130, 140, 150, and 160, all communicatively coupled to each other via a network 190.

Also shown in FIG. 1 are users 132, 142, 152 and 162. The users 132, 142, 152 and 162 may be a human user (e.g., a human being), a machine user (e.g., a computer configured by a software program to interact with the device 130), or any suitable combination thereof (e.g., a human assisted by a machine or a machine supervised by a human). The users 132, 142, 152 and 162 are not part of the network environment 100, but are respectively associated with devices 130, 140, 150, and 160 as users of the devices 130, 140, 150, and 160. For example, the devices 130, 140, 150, and 160 may each be a desktop computer, a vehicle computer, a tablet computer, a navigational device, a portable media device, or a smart phone that respectively belongs to the users 132, 142, 152 and 162.

Each of the users 132, 142, and 152 may submit a request to a central server via operation of devices 130, 140, and 150, respectively. The geofence machine 110 may collect location data points associated with the requests to the central server from devices 130, 140, and 150 (e.g., a location a device when the request is sent). Moreover, the geofence machine 110 may create a geographic heatmap that depicts the location data points associated with the requests to the central server from devices 130, 140, and 150. For instance, the geographic heatmap may identify a concentration of location data points associated with the requests to the central server. As depicted in FIG. 1 the location data points associated with the requests from devices 130, 140, and 150 may all be proximate to a target location 170. Subsequently, the geofence machine 110 may generate a geofence around the target location 170 in order to detect other users (e.g., user 162) that may cross into the target location 170. For example, each of users 132, 142, and 152 may send a request using devices 130, 140, and 150 respectively in order to retrieve information regarding the target location 170.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the geofence machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
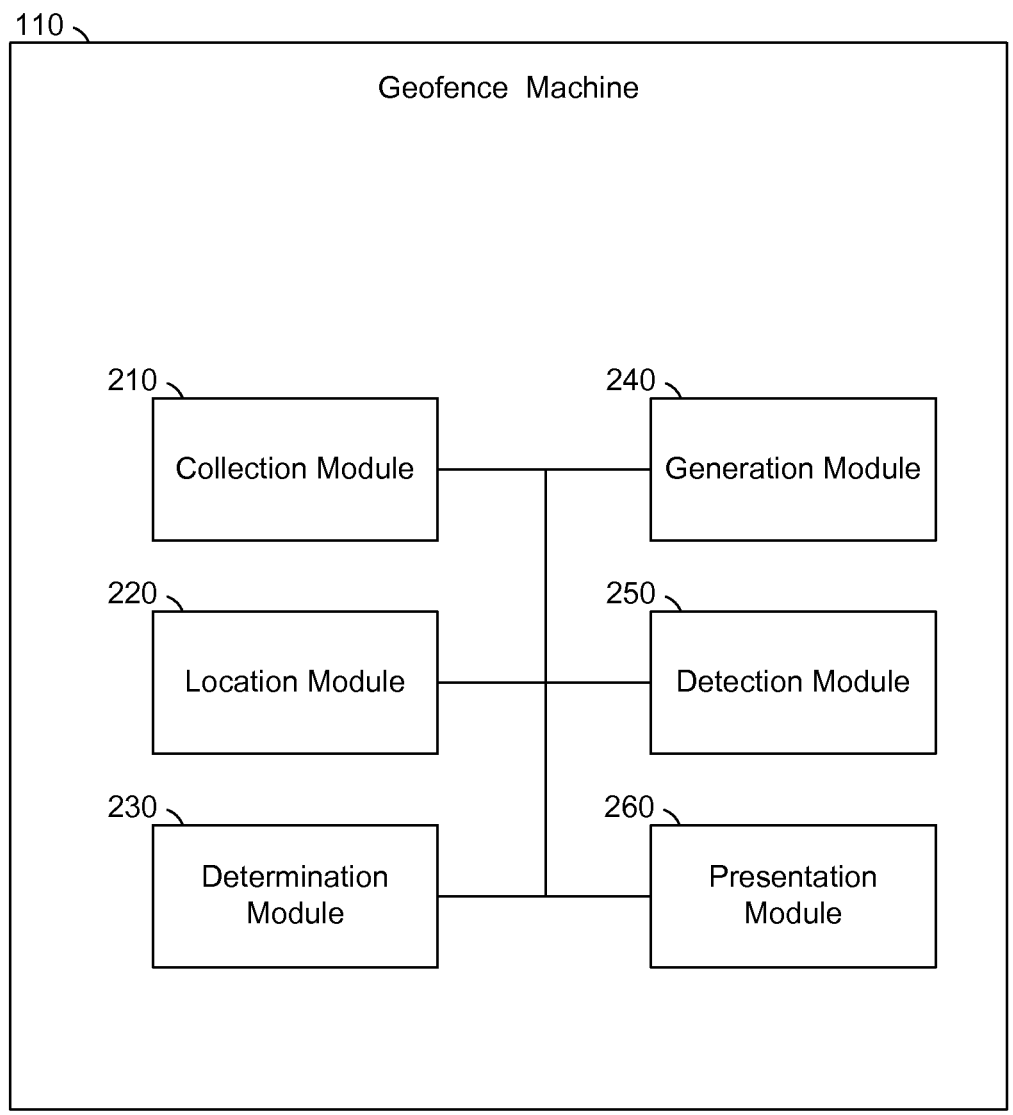
FIG. 2 is a block diagram illustrating components of a geofence machine suitable for generating a geographic heatmap, according to some example embodiments.

FIG. 2 is a block diagram illustrating components of the geofence machine 110 suitable for generating a geographic heatmap, according to some example embodiments. The geofence machine 110 is shown as including a collection module 210, a location module 220, a determination module 230, a generation module 240, a detection module 250, and a presentation module 260, all configured to communicate with each other (e.g., via a bus, shared memory, or a switch).

In various example embodiments, the collection module 210 is configured collect a plurality of location data points that correspond to a group of users (e.g., users 132, 142, and 152). In various example embodiments, each of the group of users may be operating a user device (e.g., devices 130, 140, and 150). Moreover, the plurality of location data points may each correspond to a request sent over a network and received at a central server from one of the user devices. A request to access the central server may include a request to access an online page hosted on the central server, a request to purchase an item available for sale, a request to perform a location based search, a request to view an online map hosted on the central server, a request to access information via application installed on the user device, or any suitable combination thereof. For instance, a user may perform any of the above listed actions on application installed on the user device, which in turn may cause the user device send a request to the central server. In some instances, the collection module 210 may actively collect location data from the user devices without any impetus or request being made. In other words, information may be collected from each of the user devices in the absence of a request. In various example embodiments, the collection module 210 is further configured to access user demographics of the group of users corresponding to the plurality of location data points. The user demographics may describe each user and may be retrieved from the user devices of the group of users. For instance, the information describing the each user may be stored on the user device as part of a user account or user profile. Alternatively, the collection module 210 may request user demographic information from the user device. A further embodiment may include the collection module 210 accessing the user demographics from a database that is managed by the central server. The user demographics may be stored in the database under the user account or the user profile. In various example embodiments, the collection module 210 is further configured to collect the plurality of location data points over a pre-defined interval of time (e.g., a day, a week, a month, and a year). In various example embodiments, the collection module 210 is further configured to receive a location of a target user. The target user may also be located proximate to a location identified in a geographic heatmap, as further explained below. As further explained below, the target user may be a recipient of promotional publications associated with a target location. In various example embodiments, the collection module 210 is further configured to receive an indication to update a geographic heatmap based on a new pre-defined threshold value, as further explained below.

In various example embodiments, the location module 220 may create a geographic heatmap based on the plurality of location data points collected by the collection module 210. The created geographic heatmap may identify density distributions of the plurality of location data points. In various example embodiments, the density distributions can highlight concentrations of the location data points around each of a plurality of identified locations. For instance, the density distributions groups of location data points at each of the plurality of identified locations. In various example embodiments, the density distributions identified in the geographic heatmap are of various densities (e.g., each of the identified locations may have a various number of location data points included in them). Moreover, the location module 220 may be further configured to generate a scheme to highlight the various densities among the density distributions identified by the geographic heatmap. For instance, the location module 220 may color code each of the density distributions according to their parameters (e.g., a number of location data points within an area). Alternatively, the location module 220 may size or shape each of the density distributions according to their parameters. In various example embodiments, the location module 220 may be further configured to label the density distributions according to the accessed user demographics of the group of users. For instance, the location module 220 may depict a breakdown of each of the users corresponding to the density distributions. For example, a college bookstore located in a college town may have a density distribution of location data points corresponding to requests primarily from college students. In other words, the density distributions of the geographic heatmap may be labeled to indicate the type of users that correspond to the location data points included the density distributions. Alternatively, the geographic heatmap may be labeled to indicate user activities engaged in at each of the density distributions. The geographic heatmap may be highlighted to indicate which activities are being conducted in each of the density distribution. Certain activities may include users conducting a purchase and making a payment via a mobile application installed on their user device, and users attending a concert and accessing a web page that includes information about the concert. In various example embodiments, the location module 220 is further configured to create the geographic heatmap after the pre-defined interval of time has elapsed, during which the collection module 210 is collecting the plurality of location data points. Moreover, the density distributions of the geographic heatmap may be concentrations of the location data points collected over the pre-defined interval of time. For example, the density distributions of the geographic heatmap may represent location data points collected over the weekend. Alternatively, the density distributions of the geographic heatmap may represent location data points collected during the weekdays from 3 PM-6 PM. In various example embodiments, the density distributions of the geographic heatmap may be labeled based on identifying locations on a map that correspond to the density distributions. The map may be a visual representation of an area with certain locations already labeled (e.g., baseball stadium, library, museum). As such, once the location module 220 has created the density distributions of the geographic heatmap, the density distributions may be matched with locations on the map that have already been labeled. For example, a density distribution that is nearby a baseball stadium may be labeled as a density distribution consisting primarily of sports fans conducting activities related to sports. Moreover, the density distributions may be verified based on the accessed user demographics as well as the user requests to the central server that may have originated from locations included in the density distribution nearby the baseball stadium.

In various example embodiments, the determination module 230 may analyze the density distributions within the geographic heatmap to identify a target location from one of the plurality of identified locations. The determination module 230 may be further configured to identify the target location as having a density profile including parameters exceeding one or more pre-defined thresholds. In various example embodiments, the parameters included in the density profile of the target location indicate a number of location data points within a pre-defined area centered around the target location. For example, the parameters may include a number of location data points per square mile, per square kilometer, or any other measurement of a pre-defined area. Moreover, the determination module 230 may identify the target location as having a number of location data points within the pre-defined area that exceeds the pre-defined threshold amount. In various example embodiments, the determination module 230 is further configured to analyze the density distributions to identify the target location based on the location of the target user received at the collection module 210. In various example embodiments, the determination module 230 is further configured to analyze the density distributions to identify a new target location with a density profile including parameters exceeding the new pre-defined threshold value that is received at the collection module 210.

In various example embodiments, the generation module 240 may generate a geofence around the selected target location. The geofence may enable detection of target users for distribution of promotional publications associated with the target location. For instance, the promotional publications may describe an event corresponding to the target location. The event may include a listing of an item available for sale at the target location, reduction in price of an item available for sale at the target location, or any suitable combination thereof. In various example embodiments, the size of the geofence around the target location is based on the parameters included in the density profile of the target location. Likewise, the shape of the geofence around the target location may be based on the parameters included in the density profile of the target location. For instance, the generation module 240 may be further configured to generate a geofence with a large radius around a target location that includes a large number of location data points within a pre-defined area of the target location. Moreover, the generation module 240 may generate a geofence with a small radius around a target location that includes a small number of location data points within the pre-defined area of the target location.

In various example embodiments, the detection module 250 may detect a target user, via a corresponding device, as being within the generated geofence around the target location. For instance, the detection module 250 may detect the location of the corresponding device of the target user as being located within the geofence surrounding the target location. The location of the corresponding device of the target user may be identified using a GPS receiver attached to the device. Moreover, the location of the corresponding device may be sent from the corresponding device to the detection module 250.

In various example embodiments, the presentation module 260 may present the promotional publications associated with the target location to a device of the target user. The promotional publications associated with the target location may be presented in response to the detection module detecting the target user as being within the generated geofence around the target location. In various example embodiments, the promotional publications may be further associated with the user demographics of the group of users. For instance, the presentation module 260 may include in the promotional publications a message that addresses the user demographics of the group of users. For example, college students that frequent the local bookstore may receive promotional publications related to college textbooks. In various example embodiments, the presentation module 260 is further configured to present the promotional publications associated to a further user device that previously sent a request that corresponds to the location data point included in the target location. For instance, the further user device may have been used to send a request corresponding to the location data point identified as being within the target location. Therefore, in some instances, a user operating the further user device may have been within the target location to send the request but may have traveled outside the target location since sending the request. The presentation module 260 may present the promotional publications associated with the target location to the further user device despite being located outside the target location.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
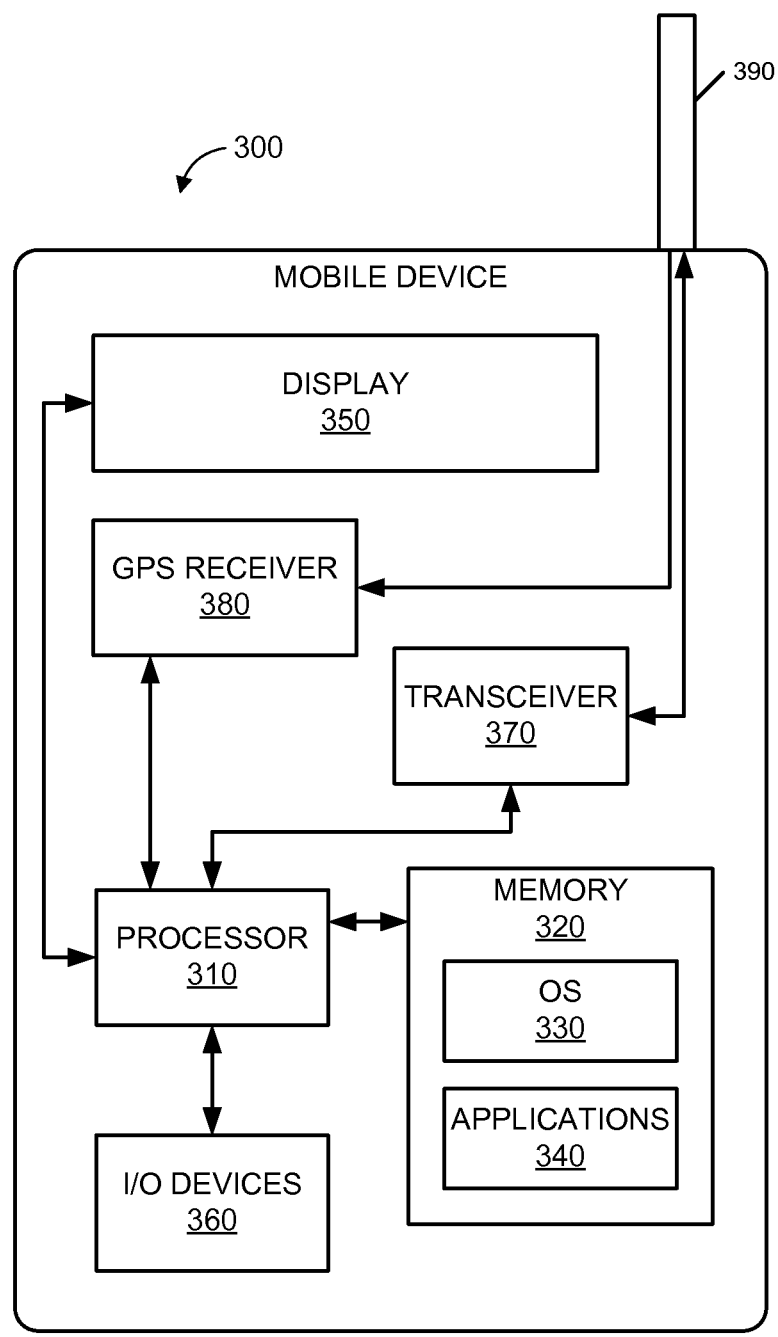
FIG. 3 is a block diagram illustrating a mobile device, according to some example embodiments.

FIG. 3 is a block diagram illustrating a mobile device, according to an example embodiment. The mobile device 300 may correspond to any one of devices 130, 140, 150, and 160 of FIG. 1. The mobile device 300 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs 340, such as a mobile location enabled application that may provide LBSs to a user. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, connection with the communication network 190 may be established. Further, in some configurations, a GPS receiver 380 may also make use of the antenna 390 to receive GPS signals.

Figure 4:
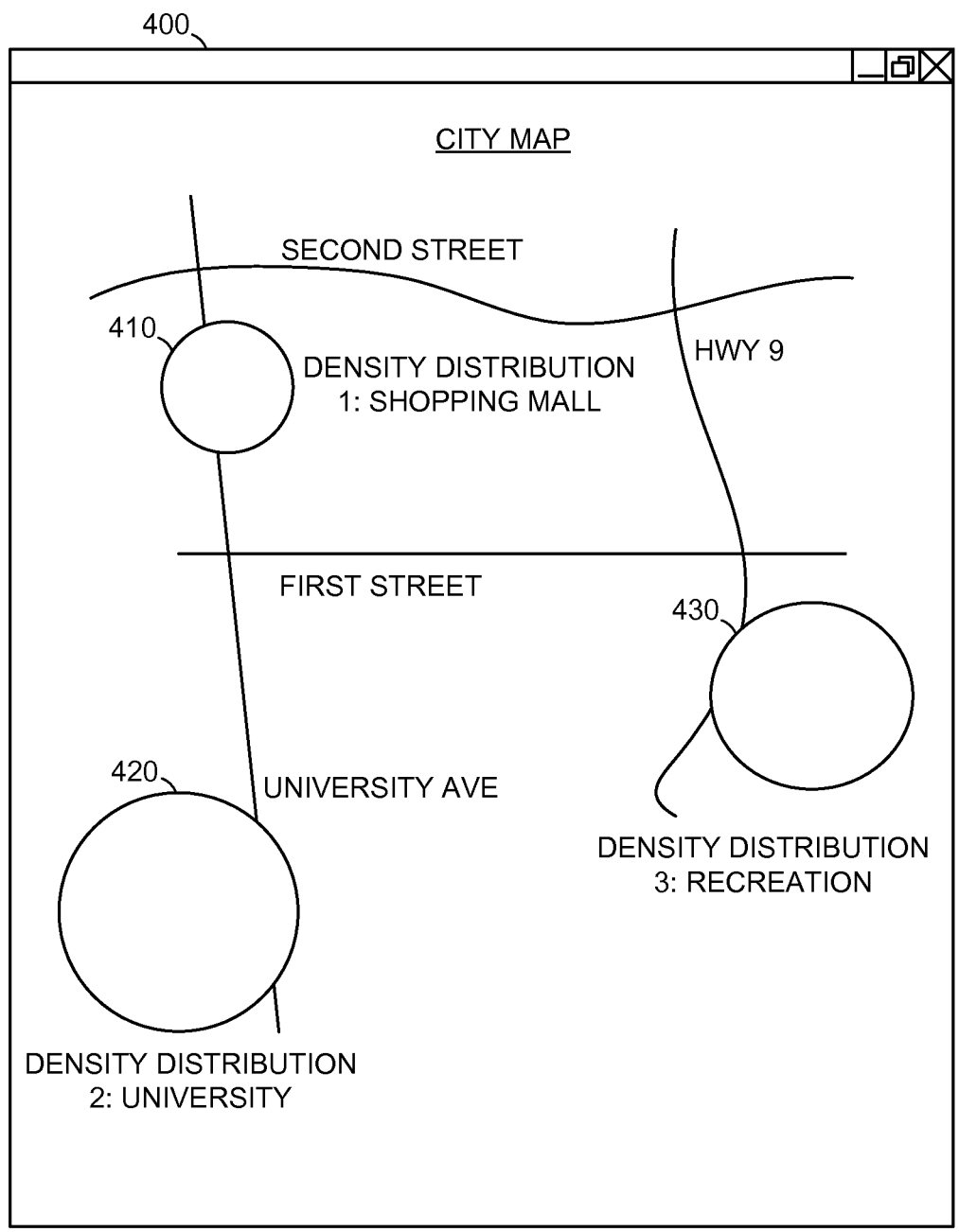
FIG. 4-5 are example user interfaces of a geographic heatmap with density distributions, according to some example embodiments.

FIG. 4 is an example user interface 400 of a geographic heatmap with density distributions, according to some example embodiments. The density distributions may be displayed on a map (e.g., a map of a city). A first density distribution 410 may include a concentration of location data points corresponding to shoppers that are hanging out at a shopping mall. A second density distribution 420 may include a concentration of location data points corresponding to students that are browsing a bookstore. A third density distribution 430 may include a concentration of location data points corresponding to athletes working out at a gym. In various example embodiments, a geofence may be generated around one of the density distributions 410, 420, and 430. Moreover, each of the density distributions may include a plurality of location data points corresponding to a group of users. Each of the density distributions may be further labeled based on the user demographics of the group of users.

Figure 5:
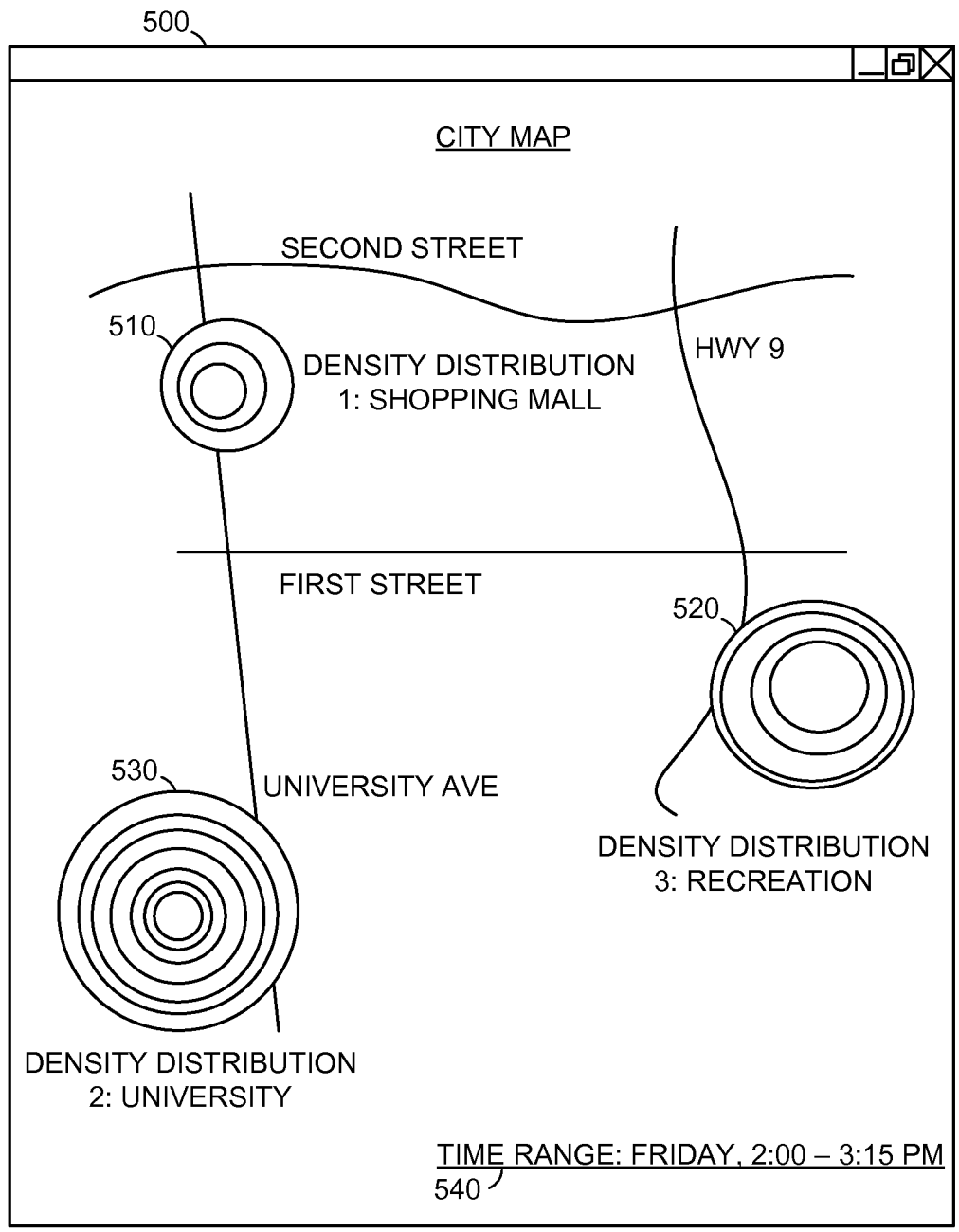

FIG. 5 is an example user interface 500 of a geographic heatmap with density heatmap with density distributions of various densities. As stated previously, a generated scheme may be used to differentiate the various densities of location data points included in each of the density distributions. As an example, a gradient may be used to depict the density of a density distribution. Similar to the first density distribution 410 of FIG. 4, the first density distribution 510 may include a concentration of location data points corresponding to shoppers that are hanging out at a shopping mall. A steeper gradient may correspond with a denser density distribution (e.g., greater number of location data points concentrated within the density distribution). For instance, the first density distribution 510 may be indicated as having a fewer concentration of location data points as compared to a second density distribution 520 (e.g., as indicated by a number of concentric circles displayed within each respective density distributions). In an example, each concentric circle moving toward the center of density distribution 520 illustrates a higher level of density, with the center circle indicating the highest level of density. Thresholds can be used to select between different density levels within a density distribution, such as density distribution 520. Moreover, the third density distribution 530 may be indicated as having a greater concentration of location data points as compared to both the first and second density distributions. In various example embodiments, the geographic heatmap may also indicate a range 540 over which the location data points are collected by the collection module 210. As depicted in the user interface 500, the geographic heatmap is created using location data points collected from 2:00 to 3:15 pm on a Friday.

Figure 6:
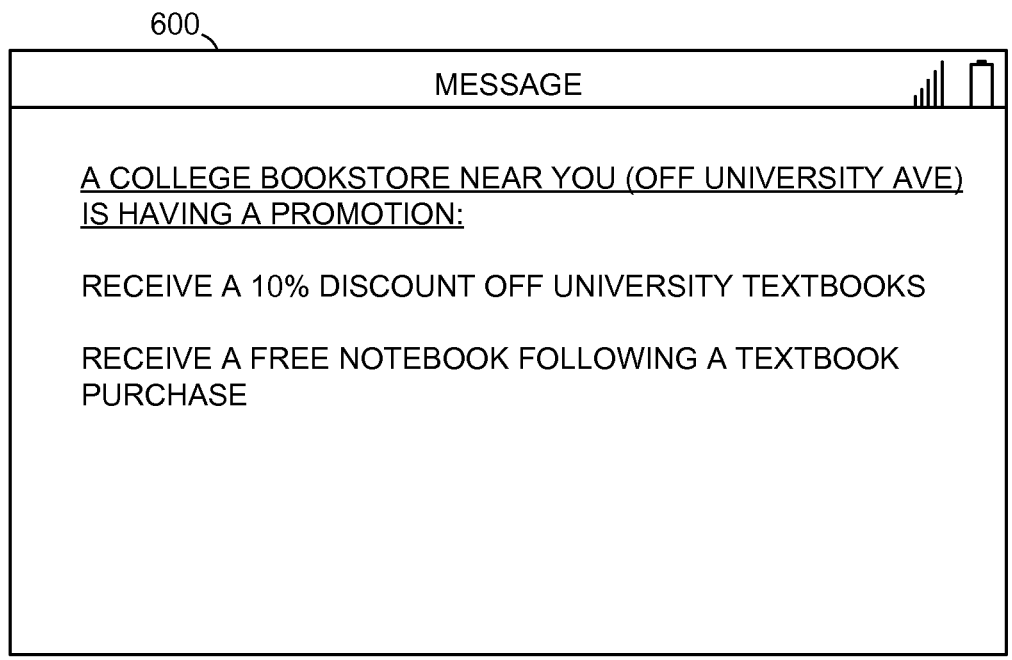
FIG. 6-7 are example user interfaces of a promotional publication associated with a target location, according to some example embodiments.

FIG. 6 is an example user interface of a promotional publication 600 associated with a target location, according to some example embodiments. In various example embodiments, the target location corresponds to the density distribution 420 of FIG. 4. Moreover, the target location may be surrounded by a geofence in order to detect a user device crossing into the target location. In various example embodiments, the promotional publication 400 may be presented to the user device belonging to a user that crosses into the target location.

Figure 7:
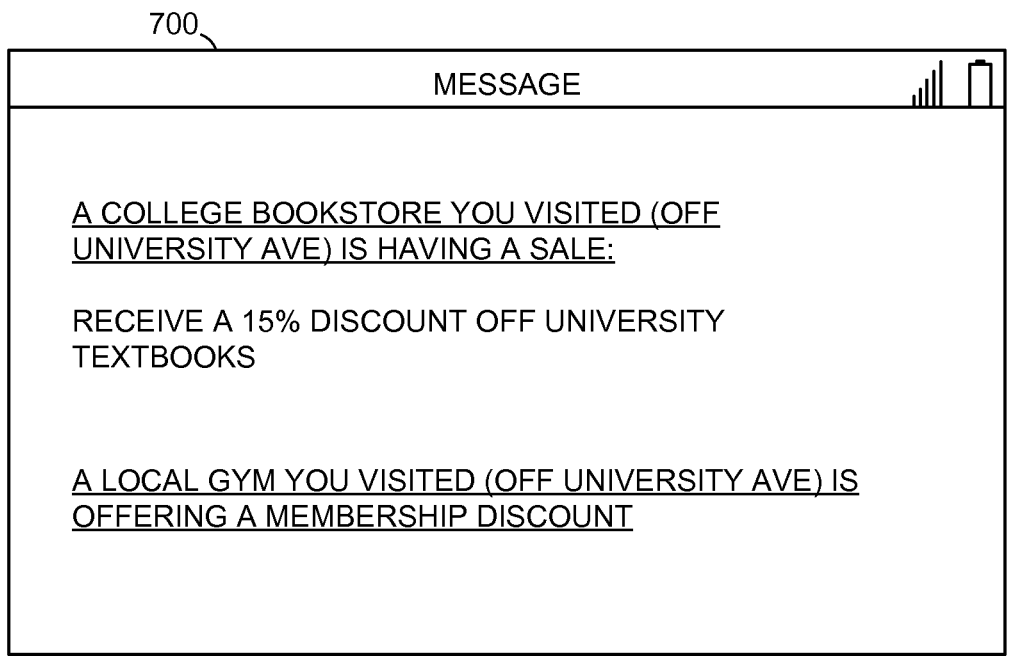

FIG. 7 is an example user interface of a promotional publication 700 associated with a target location, according to some example embodiments. In various example embodiments, the target location corresponds to the density distribution 420 of FIG. 4. Moreover, the promotional publication 700 may be presented to a user device that corresponds to a location data point included within the target location. For instance, a user operating the user device may have previously sent a request to the central server from within the target location but may have traveled outside of the target location since the request was made. For example, a college student operating the user device may have previously sent a request to the central server from a college bookstore (e.g., looking up information on items in the bookstore using their smartphone). The student may later receive a message regarding the college bookstore even though the student may now be at home. Likewise, the college student may receive a message about a local gym the student visited earlier even though the student is now at home.

Figure 8:
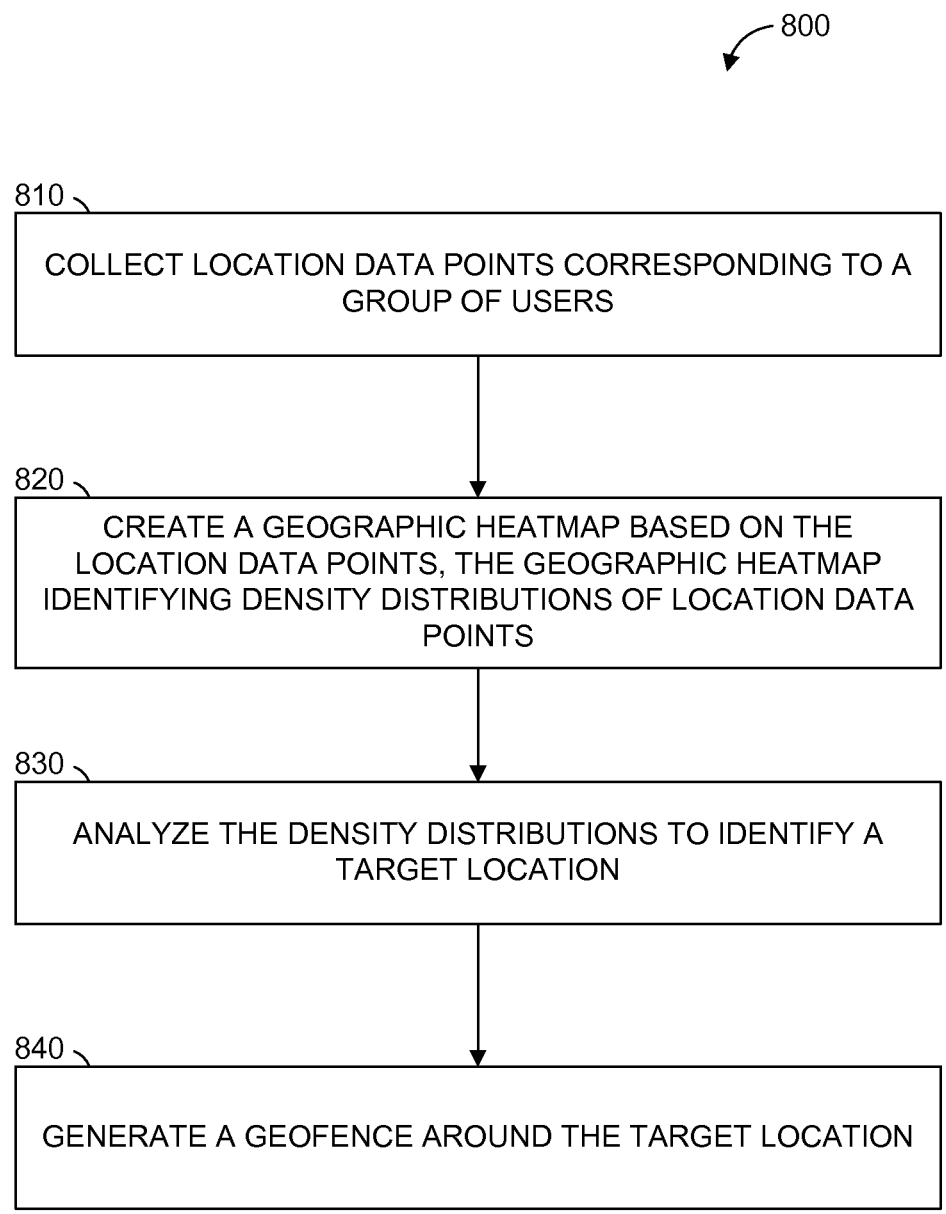
FIG. 8-10 are flowcharts illustrating operations of performing a method of generating a geofence around a target location, according to some example embodiments.
Figure 9:
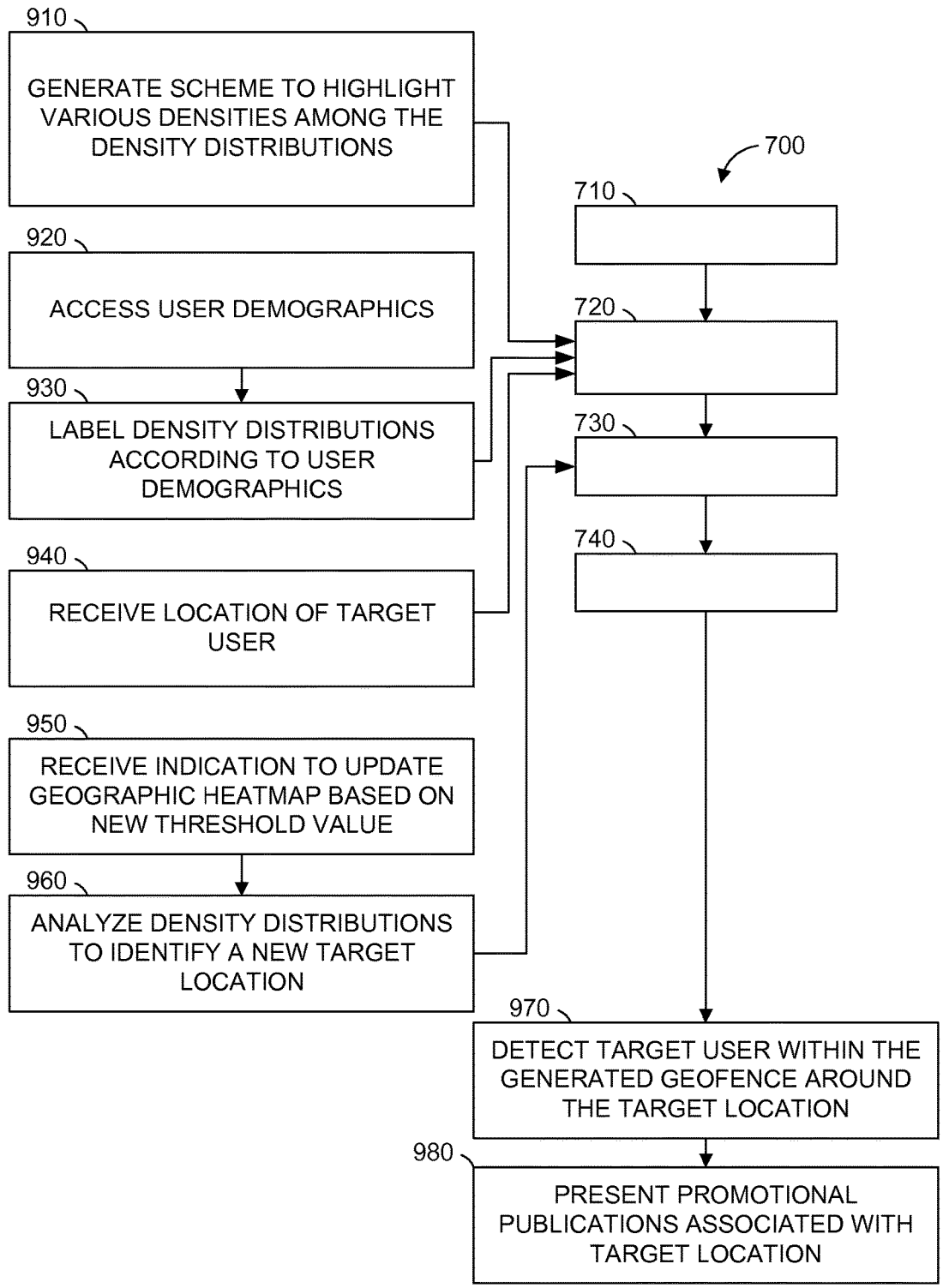
Figure 10:
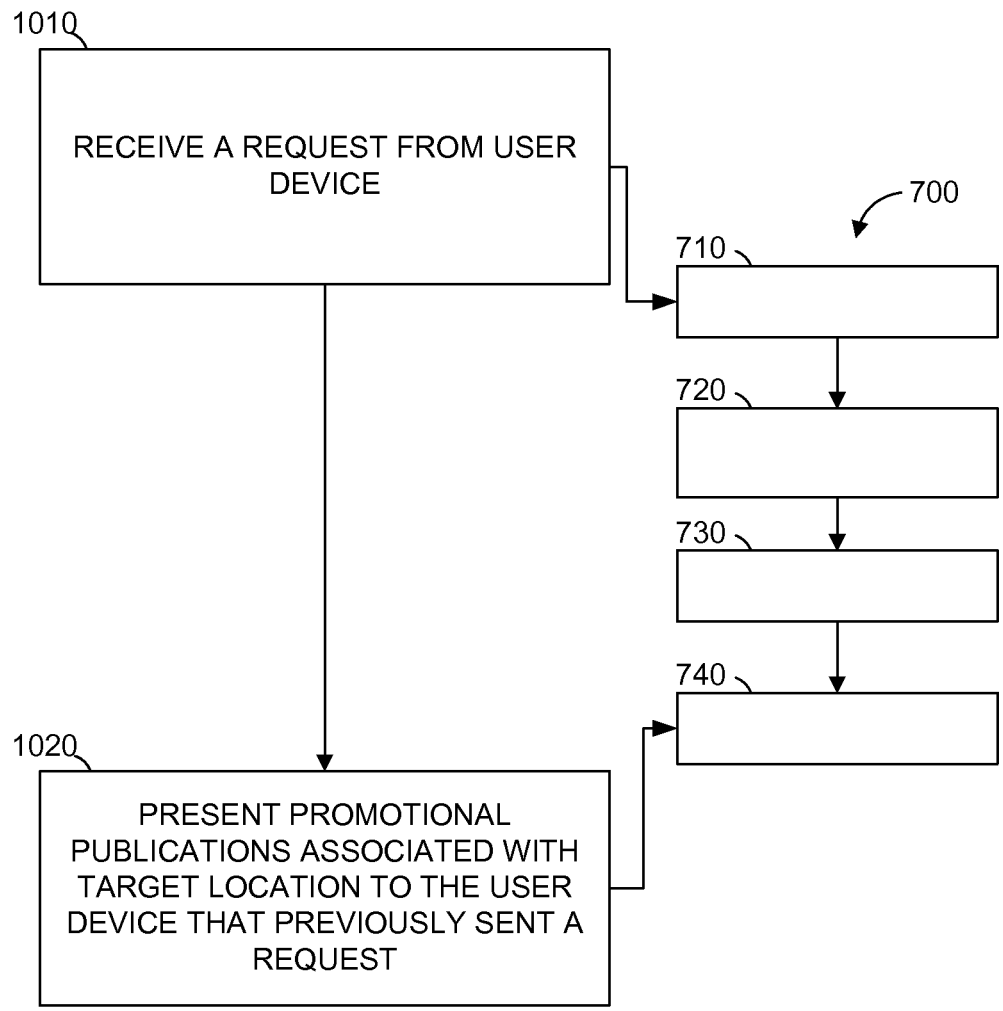

FIG. 8-10 are flowcharts illustrating operations of performing a method 800 of generating a geofence around a target location, according to some example embodiments. As shown in FIG. 8, the method 800 includes operations 810, 820, 830, and 840. The method 800 may begin at operation 810 with the collection module 210 collecting location data points corresponding to a group of users.

At operation 820, the location module 220 may create a geographic heatmap based on the location data points. The geographic heatmap may identify density distributions of the location data points. The density distributions may be concentrations of the location data points included in each of a plurality of identified locations. Moreover, the location data points may be collected by the collection module 210 at operation 810.

At operation 830, the determination module 230 may analyze the density distributions within the geographic heatmap to identify a target location from one of the plurality of identified locations. The determination module 230 may determine the target location has having a density profile including parameters exceeding one or more pre-defined thresholds. In various example embodiments, the parameters included in the density profile of the target location indicate a number of location data points within a pre-defined area centered around the target location. For example, the parameters may include a number of location data points per square mile, per square kilometer, or any other measurement of a pre-defined area. Moreover, the determination module 230 may identify the target location as having a number of location data points within the pre-defined area that exceeds the pre-defined threshold amount. For example, the determination module 230 may identify a target location has at least meeting the threshold requirement of thirty location data points per square mile.

At operation 840, the generation module 240 may generate a geofence around the target location. The generated geofence may enable detection of target users for distribution of promotional publications associated with the target location. For instance, the detection module 250 may detect the location of a corresponding device of the target user as being located within the geofence surrounding the target location. The location of the corresponding device of the target user may be identified using a GPS receiver attached to the device. Moreover, the location of the corresponding device may be sent from the corresponding device to the detection module 250. As an example, the target user operating a smartphone may active a location-based service while in the target location, which triggers the location of the corresponding device of the target user to be sent to the detection module 250.

As shown in FIG. 9, the method 800 may include one or more of operations 910, 920, 930, 940, 950, 960, 970, and 980.

At operation 910, the location module 220 generates a scheme to highlight various densities among the density distributions identified by the geographic heatmap. For instance, the location module 220 may color code each of the density distributions according to their parameters (e.g., a number of location data points within an area). Alternatively, the location module 220 may size or shape each of the density distributions according to their parameters.

At operation 920, the collection module 210 may access user demographics of the group of users corresponding to the plurality of location data points. For instance, the information describing the each user may be stored on the user device as part of a user account or user profile, which gets collected by the collection module 210. Alternatively, the collection module 210 may request user demographic information from the user device. A further embodiment may include the collection module 210 accessing the user demographics from a database that is managed by the central server. The user demographics may be stored in the database under the user account or the user profile.

At operation 930, the location module 220 may label the density distributions according to the accessed user demographics of the group of users. For instance, the location module 220 may depict a breakdown of each of the users corresponding to the density distributions. For example, a college bookstore located in a college town may have a density distribution of location data points corresponding to requests primarily from college students. In other words, the density distributions of the geographic heatmap may be labeled to indicate the type of users that correspond to the location data points included the density distributions. Alternatively, the geographic heatmap may be labeled to indicate user activities engaged in at each of the density distributions. The geographic heatmap may be highlighted to indicate which activities are being conducted in each of the density distribution. Certain activities may include users conducting a purchase and making a payment via a mobile application installed on their user device, and users attending a concert and accessing a web page that includes information about the concert.

At operation 940, the collection module 210 may receive a location of a target user. Moreover, the determination module 230 may identify the target location based on the received location of the target user. The location of the target user may be proximate to one the plurality of identified locations within the created geographic heatmap.

At operation 950, the collection module 210 may receive an indication to update the geographic heatmap based on a new pre-defined threshold value. The determination module 230 may be further configured to identify a new target location with a density profile including parameters exceeding the new pre-defined threshold value.

At operation 960, the determination module 230 may analyze the density distributions within the geographic heatmap to identify a new target location from one of the plurality of identified locations based on the new pre-defined threshold value.

At operation 970, the detection module 250 may a detect a target user, via a corresponding device, as being within the generated geofence around the target location. For instance, the detection module 250 may detect the location of the corresponding device of the target user as being located within the geofence surrounding the target location. The location of the corresponding device of the target user may be identified using a GPS receiver attached to the device. Moreover, the location of the corresponding device may be sent from the corresponding device to the detection module 250.

At operation 980, the presentation module 260 may present promotional publications associated with the target location to the corresponding device of the target user.

As shown in FIG. 10, the method 600 may include one or more of operations 1010 and 1020. At operation 1010, the collection module 210 may receive a request from a requesting user device. The request received from the requesting user device may correspond to a location data point. Moreover, the location data point may be collected by the collection module 210 and thereafter designated as a target location of a geographic heatmap created by the location module 220.

At operation 1020, the presentation module 260 may present promotional publications associated with the target location to the requesting user device. In some instances, the requesting user device may no longer be at the location data point from which the request was sent to the central server and collected via the collection module 210. Nevertheless, the requesting device may still qualify and receive promotional publications associated with the target location. For example, a student that is exercising at a local gym may be accessing data with a mobile application installed on their smart phone. At a later time, the student may receive a promotional message about the local gym even though the student is now at home.

Figure 11:
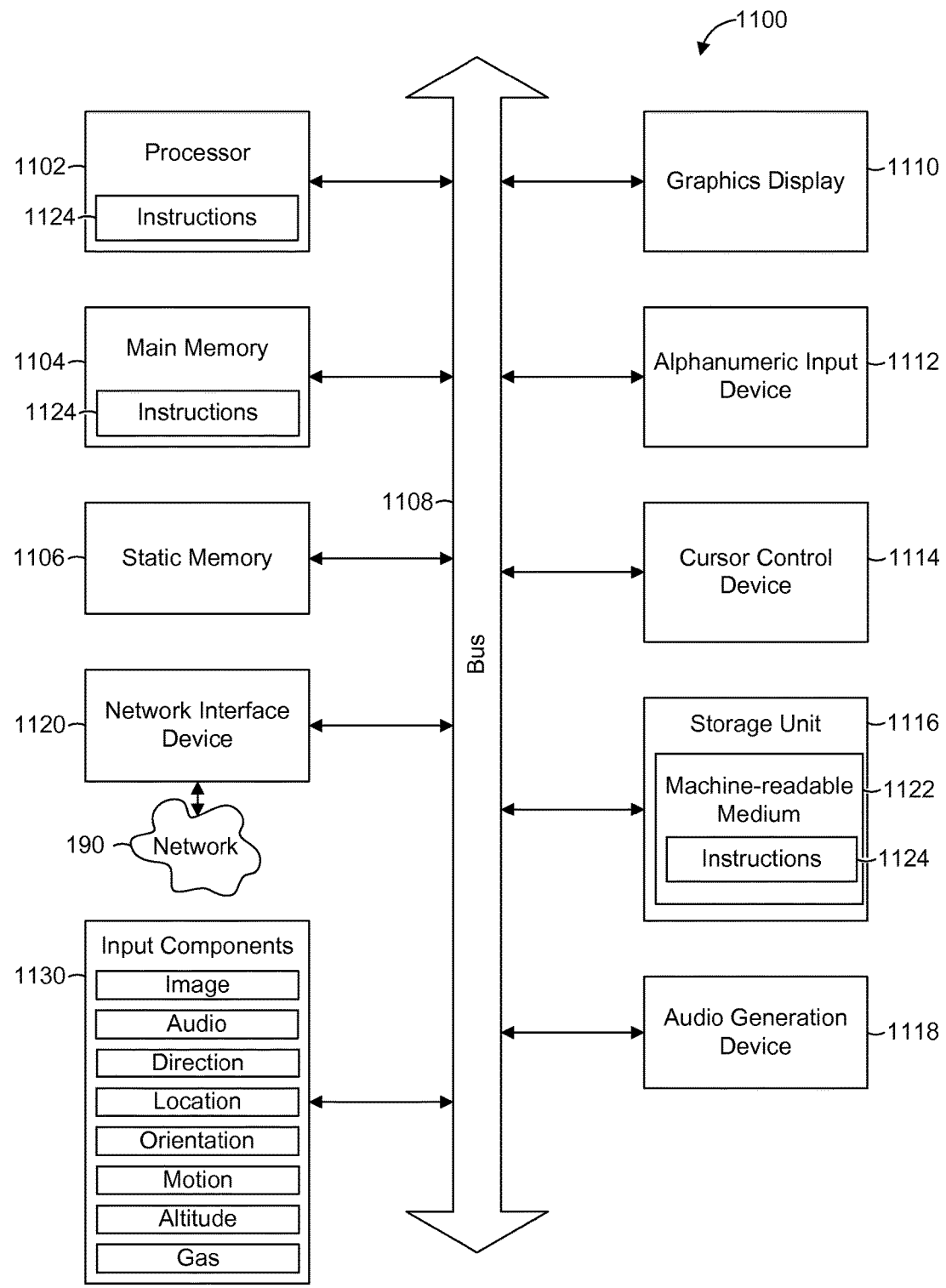
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a machine-readable storage medium, a computer-readable storage medium, or any suitable combination thereof) and perform any one or more of the methodologies discussed herein, in whole or in part. Specifically, FIG. 11 shows the machine 1100 in the example form of a computer system within which the instructions 1124 (e.g., software, a program, an application, an applet, an app, or other executable code) for causing the machine 1100 to perform any one or more of the methodologies discussed herein may be executed, in whole or in part. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    collecting a plurality of location data points that correspond to a group of users each operating a user device, each location data point of the plurality of location data points corresponding to a request, sent over a network and received at a central server, from a user device of a user among the group of users;
    creating, using a processor, a geographic heatmap based on the collected plurality of location data points, the geographic heatmap identifying density distributions of the plurality of location data points, the density distributions being concentrations of the location data points included in each of a plurality of identified locations;
    rendering the geographic heatmap in a user interface on a computer device;
    analyzing the density distributions within the geographic heatmap to identify a target location from one of the plurality of identified locations with a density profile including parameters exceeding one or more pre-defined thresholds;

generating a geofence around the target location, the geofence enabling detection of target users for distribution of promotional publications associated with the target location, a size of the geofence around the target location being based on the parameters included in the density profile of the target location;

detecting a target user, via a corresponding device, as being within the generated geofence around the target location;

rendering, on the geographic heatmap in the user interface, a plurality of concentric circles around the target location, the plurality of concentric circles being higher in number as the number of location data points associated with the target location increases;

receiving an update to the one or more thresholds;

based on the update to the one or more thresholds, dynamically altering the display of the concentric circles on the geographic heatmap in the user interface; and causing presentation of the promotional publications associated with the target location to the corresponding device of the target user.

2. The method of claim 1, wherein the parameters included in the density profile of the target location indicate a number of location data points within a pre-defined area centered around the target location.

3. The method of claim 1, wherein the geographic heatmap identifies density distributions of various densities, and wherein the creating the geographic heatmap includes generating a scheme to highlight the various densities among the density distributions identified by the geographic heatmap.

4. The method of claim 1, further comprising:
accessing user demographics of the group of users corresponding to the plurality of location data points, and wherein the creating the geographic heatmap includes labeling the density distributions according to the accessed user demographics of the group of users, and wherein the promotional publications are further associated with the user demographics of the group of users.

5. The method of claim 1, further comprising:
receiving an indication to update the geographic heatmap based on a new pre-defined threshold value; and
analyzing the density distributions to identify a new target location with a density profile including parameters exceeding the new pre-defined threshold value.

6. The method of claim 1, wherein the collecting the plurality of location data points is performed over a pre-defined interval of time, and wherein the creating the geographic heatmap is performed after the pre-defined interval of time has elapsed, the density distributions of the geographic heatmap being concentrations of the location data points collected over the pre-defined interval of time.

7. The method of claim 1, wherein the request to the central server received via the network from the user device includes at least one of: a request to access an online page, a request to purchase an item available for sale, a request to perform a user-based check-in, a request to perform a location-based search, a request to view an online map, and a request to access information via an application installed on the user device.

8. The method of claim 1, further comprising:
receiving a location of a target user proximate to one of the plurality of identified locations, and wherein the analyzing the density distributions to identify the target location is further based on the received location of the target user.

9. The method of claim 1, further comprising:
causing presentation of the promotional publications associated with the target location to a further user device, the further user device having previously sent a request that corresponds to the location data point included in the target location.

10. The method of claim 1, wherein the shape of the geofence around the target location is based on the parameters included in the density profile of the target location.

11. A system comprising:
one or more processors and executable instructions accessible on a computer-readable medium that, when executed, configures the one or more processors to at least:

collect a plurality of location data points that correspond to a group of users each operating a user device, each location data point of the plurality of location data points corresponding to a request, sent over a network and received at a central server, from a user device of a user among the group of users;

create a geographic heatmap that depicts the collected plurality of location data points, the geographic heatmap identifying density distributions of the plurality of location data points, the density distributions being concentrations of the location data points included in each of a plurality of identified locations;

render the geographic heatmap in a user interface on a computer device;

analyze the density distributions within the geographic heatmap to identify a target location from one of the plurality of identified locations with a density profile including parameters exceeding one or more pre-defined thresholds;

generate a geofence around the target location, the geofence enabling detection of target users for distributions of promotional publications associated with the target location, a size of the geofence around the target location being based on the parameters included in the density profile of the target location;

detect a target user, via a corresponding device, as being within the generated geofence around the target location;

render, on the geographic heatmap in the user interface, a plurality of concentric circles around the target location, the plurality of concentric circles being higher in number as the number of location data points associated with the target location increases;

receive an update to the one or more thresholds;

based on the update to the one or more thresholds, dynamically alter the display of the concentric circles on the geographic heatmap in the user interface; and cause presentation of the promotional publications associated with the target location to the corresponding device of the target user.

12. The system of claim 11, wherein the parameters included in the density profile of the target location indicate a number of location data points within a pre-defined area centered around the target location.

13. The system of claim 11, wherein the geographic heatmap identifies density distributions of various densities, and wherein the one or more processors are further configured to generate a scheme to highlight the various densities among the density distributions identified by the geographic heatmap.

14. The system of claim 11, wherein the one or more processors are further configured to:

access user demographics of the group of users corresponding to the plurality of location data points; and
label the density distributions according to the accessed user demographics of the group of users, and wherein the promotional publications are further associated with the user demographics of the group of users.

15. The system of claim 11, wherein the one or more processors are further configured to:
receive an indication to update the geographic heatmap based on a new pre-defined threshold value; and
analyze the density distributions to identify a new target location with a density profile including parameters exceeding the new pre-defined threshold value.

16. The system of claim 11, wherein the one or more processors are further configured to:
collect the plurality of location data points over a pre-defined interval of time; and
create the geographic heatmap after the pre-defined interval of time has elapsed, the density distributions of the geographic heatmap being concentrations of the location data points collected over the pre-defined interval of time.

17. A non-transitory machine-readable medium storing instructions that, when executed by one or more processors of a machine, cause the machine to perform operations comprising:
collecting a plurality of location data points that correspond to a group of users each operating a user device, each location data point of the plurality of location data points corresponding to a request, sent over a network and received at a central server, from a user device of a user among the group of users;
creating a geographic heatmap that depicts the collected plurality of location data points, the geographic heatmap identifying density distributions of the plurality of location data points, the density distributions being concentrations of the location data points included in each of a plurality of identified locations;
rendering the geographic heatmap in a user interface on a computer device;
analyzing the density distributions within the geographic heatmap to identify a target location from one of the plurality of identified locations with a density profile including parameters exceeding one or more pre-defined thresholds;
generating a geofence around the target location, the geofence enabling detection of target users for distribution of promotional publications associated with the target location, a size of the geofence around the target location being based on the parameters included in the density profile of the target location;
detecting a target user, via a corresponding device, as being within the generated geofence around the target location;
rendering, on the geographic heatmap in the user interface, a plurality of concentric circles around the target location, the plurality of concentric circles being higher in number as the number of location data points associated with the target location increases;
receiving an update to the one or more thresholds;
based on the update to the one or more thresholds, dynamically altering the display of the concentric circles on the geographic heatmap in the user interface; and
causing presentation of the promotional publications associated with the target location to the corresponding device of the target user.

* * * * *